United States Patent Office 3,394,098
Patented July 23, 1968

3,394,098
EPOXY RESIN COMPOSITIONS
Grant McLay Cameron, Tonawanda, N.Y., assignor to Ciba Limited, Basel, Switzerland, a company of Switzerland
No Drawing. Filed Mar. 31, 1966, Ser. No. 538,950
Claims priority, application Great Britain, Apr. 7, 1965, 14,812/65
9 Claims. (Cl. 260—30.8)

ABSTRACT OF THE DISCLOSURE

Curable compositions comprising an epoxide resin, a curing agent therefor, and, as flexibilising agent, an adduct, or mixture of adducts, containing on average at least two mercaptan groups per molecule, of a monoepisulphide with a compound, or mixture of compounds, containing on average at least two hydrogen atoms directly attached to sulphur or to nitrogen.

---

This invention relates to epoxy resin compositions containing flexibilisers.

It has previously been proposed to prepare flexible cured epoxy resin compositions from epoxy resins containing long chains of carbon atoms, such as the epoxidised unsaturated fatty acid glycerides, e.g. epoxidised soya bean oil, or polyglycidyl ether of polyalkylene glycols. It is also known to prepare such compositions by using curing agents containing such chains, e.g. polysebacic anhydride or polyazelaic anhydride, or aminoamides prepared by the reaction of dimerised unsaturated higher fatty acids with aliphatic polyamines. The range of mechanical and physical properties exhibited by such compositions is, however, somewhat limited.

It has further been proposed to prepare flexible compositions by the addition, to conventional epoxy resin-hardener systems, of resinous or semi-resinous materials which also contain groups capable of reaction with the epoxide groups. Such materials include poly(alkylene oxides) (also called polyalkylene glycols), and polysulphides obtained by the reaction of dichlorodiethyl formal with an alkali metal polysulphide, for example that available commercially under the designation "Thiokol LP3" which may be represented by the general formula:

HS(C₂H₄O.CH₂OC₂H₄S.S)ₙC₂H₄O.CH₂O.C₂H₄SH where n is an integer having an average value of approximately 6.

For some applications, however, the addition of polyalkylene glycols or such polysulphides is disadvantageous. Thus, the glycols do not react with epoxy resins when incorporated in cold-setting aliphatic polyamine-epoxy resin systems, and the chemical- and water-resistance of epoxy resin formulations containing them is therefore inferior. The commercially-available polysulphides have strong odours, and their viscosities are inconveniently high for some applications. Cured epoxy resin compositions prepared from these polysulphides have low tear strengths and tend to become brittle with age. Further, the mechanical properties of anhydride-cured epoxy resin formulations containing such polysulphides are frequently unsatisfactory.

It has now been found that the use, as flexibilisers, of certain adducts of monoepisulphides affords cured epoxy resins having superior flexibility and other properties.

According to the present invention, therefore, there are provided curable compositions comprising an epoxide resin, a curing agent therefor, and, as flexibilising agent, an adduct, or mixture of adducts, containing on average at least two mercaptan groups per molecule, of a monoepisulphide with a compound, or mixture of compounds, containing on average at least two hydrogen atoms directly attached to sulphur or to nitrogen. Flexibilized products obtained by curing the aforesaid compositions are within the scope of the invention.

Monoepisulphides, i.e. compounds containing the thiiran group,

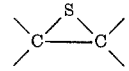

which may be used to form the flexibilising agents of the present invention include, for example, propylene sulphide (2-methylthiiran), ethylene sulphide, isobutylene sulphide, dodecylene sulphide, cyclohexene sulphide, allyl 2,3-epithiopropyl ether, and styrene sulphide. Particularly suitable monoepisulphides are those consisting solely of hydrogen, sulphur, from 2 to 10 carbon atoms and, optionally, one ether oxygen atom. Preferably, an alkylene episulphide containing from 2 to 5 carbon atoms, especially propylene sulphide, is used.

Compounds containing at least two hydrogen atoms attached directly to nitrogen or sulphur which may be used to form the flexibilising agents of the present invention include, for example, primary amines, disecondary amines, ammonia, hydrogen sulphide, and polythiols. Specific primary amines which may be used are n-butylamine, aniline, cyclohexylamine, ethylenediamine, p-phenylenediamine, and bis(4-aminophenyl)methane; specific disecondary amines which may be used are piperazine, N,N'-dimethylethylenediamine, N,N'-dimethyl-p-phenylenediamine, and bis(4-methylaminophenyl)methane. The compound containing at least two hydrogen atoms attached to nitrogen is preferably a polyamine, especially an aliphatic, cycloaliphatic or aromatic diprimary amine containing from 2 to 20 carbon atoms, or ammonia. Specific polythiols which may be used are ethane-1,2-dithiol, decane-1,10-dithiol, dipentene dimercaptan, (2-mercaptoethyl)benzenethiols, (2-mercaptoethyl)cyclohexanethiols, bis(4-mercaptomethylphenyl)ether, trithiocyanuric acid (2,4,6-trimercapto-1,3,5-triazine), 2-mercaptoethylamine, 2,4,6-tris(2-mercaptoethyl)-1,3,5-trioxan, and hydrogen sulphide-formaldehyde oligomers. Esters of mercaptoalcohols with polycarboxylic acids, such as bis(2-mercaptoethyl) succinate, or of polyhydric alcohols with mercaptocarboxylic acids, such as a polypropylene glycol bis(thioglycollate), a polypropylene triol tris(thioglycollate), or a polyethylene glycol bis(3-mercaptopropionate), may also be used. The compound containing two hydrogen atoms attached to sulphur is preferably either hydrogen sulphide or a compound consisting solely of hydrogen, sulphur, from 2 to 10 carbon atoms, and optionally, one ether oxygen atom.

The most preferred adducts are those formed from propylene sulphide and ammonia and having an average molecular weight of 500 to 2500.

The aforesaid flexibilisers, many of which are known compounds, may readily be obtained from the monoepisulphide and the compound containing at least two hydrogen atoms as aforesaid by reaction in the presence of an acid catalyst, such as boron trifluoride diethyl etherate, or a basic catalyst such as sodium ethoxide or N-benzyldimethylamine. If the compound used to react with the monoepisulphide is an amine, addition of a catalyst is usually unnecessary.

The proportion of the flexibilising agent employed in the curable compositions of the present invention may be varied within considerable limits. By way of illustration, 0.5 to 1.2 parts by weight of flexibilising agent may be used per part by weight of epoxide resin. The optimum proportion will depend on such factors as the epoxide content of the epoxide resin, the nature and proportion of the curing agent, the conditions of curing, and, in particular, of the properties (e.g., tensile strength, extensibility, solvent resistance, and heat distortion point) required of the cured resin, but may readily be found by routine experimentation.

Epoxide resins which may be used in these compositions include, for example, polyglycidyl esters obtainable by the reaction of a di- or poly-carboxylic acid with epichlorohydrin or glycerol dichlorohydrin in the presence of an alkali. Such polyglycidyl esters may be derived from aliphatic dicarboxylic acids, e.g. oxalic acid, succinic acid, glutaric acid, adipic acid, pimelic acid, suberic acid, azelaic acid, sebacic acid, or dimerised or trimerised linoleic acid, and from aromatic dicarboxylic acids such as phthalic acid, isophthalic acid, terephthalic acid, naphthalene-2,6-dicarboxylic acid, diphenyl-2,2'-dicarboxylic acid and ethylene glycol bis(4-carboxyphenyl)ether. Specific such polyglycidyl esters are, for example, diglycidyl phthalate, diglycidyl adipate and those diglycidyl esters which correspond to the average formula:

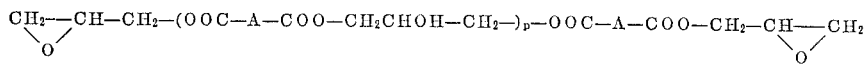

in which A represents a divalent aromatic hydrocarbon radical, such as a phenylene group, and $p$ represents a small whole or fractional number.

Other epoxide resins which may be used include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryl-dialkanolamines such as N-phenyldiethanolamine, or, preferably from dihydric or polyhydric phenols such as resorcinol, catechol, hydroquinone, 1,4-dihydroxynaphthalene, 1,5 - dihydroxynaphthalene, bis(4-hydroxyphenyl)-methane, bis(4-hydroxyphenyl)methylphenylmethane, bis-(4-hydroxyphenyl)tolylmethanes, 4,4'-dihydroxydiphenyl, bis(4-hydroxyphenyl)sulphone and, especially, 2,2-bis(4-hydroxyphenyl)propane or phenolformaldehyde condensation products.

There may further be employed aminopolyepoxides such as are, for example, obtained by the dehydrohalogenation of the reaction products of epihalohydrins and primary or disecondary amines such as aniline, n-butylamine, bis(4-aminophenyl)methane, or bis(4-methylaminophenyl)methane.

Epoxide resins obtained by the epoxidation of cyclic and acyclic polyolefins may also be employed, such as vinylcyclohexene dioxide, limonene dioxide, dicyclopentadiene dioxide, 3,4-epoxydihydrodicyclopentadienyl glycidyl ether, the bis(3,4-epoxydihydrodicyclopentadienyl)-ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, the acetal formed between 3,4-epoxycyclohexanecarboxyaldehyde and 1,1-bis(hydroxymethyl)-3,4-epoxycyclohexane, and epoxidised butadienes or copolymers of butadiene with ethylenic compounds such as styrene and vinyl acetate.

Especially suitable epoxide resins are the polyglycidyl ether of polyhydric alcohols or of polyhydric phenols.

As curing agents used in the compositions of the invention, there may be mentioned those conventionally employed as cross-linking agents for epoxide resins, for example, amines containing at least two hydrogen atoms directly attached to nitrogen, e.g. aliphatic and aromatic primary and second amines such as mono- and dibutyl-amine, p-phenylenediamine, bis(p-aminophenyl)methane, ethylenediamine, N,N'-diethyl-ethylenediamine, diethylenetriamine, tetra(hydroxyethyl)-diethylenetriamine, triethylenetetramine, tetraethylenepentamine, piperidine, guanidine, and guanidine derivatives, such as phenylguanidine and diphenylguanidine, dicyandiamide, aniline-formaldehyde resins, polymers of amino-styrenes, and polyamino-amides, e.g. those prepared from aliphatic polyamines and dimerised or trimerised unsaturated fatty acids; isocyanates and isothiocyanates; polyhydric phenols, e.g. resorcinol, hydroquinone, 2,2-bis(4-hydroxyphenyl)-propane, phenol-aldehyde resins and oil-modified phenol-aldehyde resins; reaction products of aluminium alkoxides or phenolates with tautomeric-reacting compounds of the acetoacetic ester type; Friedel-Crafts catalysts, e.g. AlCl₃, SnCl₄, ZnCl₂, BF₃, and their complexes with organic compounds; phosphoric acid; and polycarboxylic acids and their anhydrides, e.g. phthalic anhydride, methylendomethylene - tetrahydrophthalic anhydride, dodecenylsuccinic anhydride, hexahydrophthalic anhydride, hexachloro-endomethylenetetrahydrophthalic anhydrides and endomethylenetetrahydrophthalic anhydride, and their mixtures, and maleic and succinic anhydrides. Preferably, the agent is a polyamine.

Catalytic hardeners may also be used, especially tertiary amines such as 2,4,6-tris(dimethylaminomethyl)-phenol, triethanolamines, and N-benzyldimethylamine; and also alkali metal alkoxides of alcohols such as 2,4-dihydroxy-3-hydroxymethylpentane, stannous salts of alkanoic acids, such as stannous octoate, aluminium alkoxides, and triphenylphosphine.

The compositions of the present invention may contain reactive diluents such as phenyl glycidyl ether, allyl glycidyl ether, or n-butyl glycidyl ether. They may also contain fillers, other plasticisers, and colouring agents, for example, asphalt, bitumen, glass fibres, mica, quartz powder, cellulose, kaolin, finely-divided silica (such as that available under the registered trademark "Aerosil"), or metal powder. The aforesaid compositions may be used, for example, as flexibilised dipping, casting, potting, encapsulating, coating and adhesive resins. They are especially valuable for the production of flexible products used in caulking, cable-joining and civil engineering applications.

The flexibilising agents employed in the examples were prepared as follows. Temperatures are given in degrees centigrade.

Flexibiliser A

A stirred mixture of ethane-1,2-dithiol (9.4 g., 0.1 g.-mole) and boron trifluoride diethyl etherate (10 drops) was heated at 70 to 75° in an atmosphere of nitrogen, and propylene sulphide (88.8 g., 1.2 g.-mole) was then added slowly at a rate sufficient to maintain the mixture at this temperature without the external application of heat. The mixture was heated for 1 hour at 100°, and volatile materials were then removed by heating the mixture to 155° under 0.5 mm. pressure. The residue was a clear, slightly viscous liquid, having an average molecular weight (as shown by iodine titration and by acetylation) of 980; the yield was 92.5 g., i.e. 97% of the theoretical value.

Flexibiliser B

Propylene sulphide (30 g., approx. 0.4 g.-mole) was added to a stirred mixture of decane-1,10-dithiol (10.3 g., 0.05 g.-mole), boron trifluoride diethyl etherate (6 drops) and benzene (50 ml.), heated to 70° in an atmosphere of nitrogen, at a rate sufficient to maintain the mixture at this temperature without application of heat. The mixture was then heated under reflux for 5 hours, and volatile materials removed therefrom by heating to 115° under 0.5 mm. pressure. The residue was a clear, slightly viscous liquid, having an average molecular weight of 800; the yield was 39.1 g., 97% of the theoretical yield.

Flexibiliser C

Hydrogen sulphide was passed into ethanol (150 ml.) containing 15 drops of N-benzyldimethylamine at room temperature until a saturated solution was formed. This solution was heated to 60° and propylene sulphide (74 g., 1 g.-mole) in ethanol (70 ml.) was added slowly. On being cooled, the mixture separated into two layers. Volatile materials were removed by heating the mixture at 90° under 14 mm. pressure. There remained 39.3 g. of a clear, slightly viscous liquid, having an average molecular weight (as determined by acetylation) of 645. Analysis indicated that the product contained C=46.88%, H=8.12%, S=45.05%, i.e. that it contained no combined oxygen.

Flexibiliser D

9 N-methanolic ammonia solution (16.7 ml., 0.15 g.-mole) was diluted with 33 ml. of methanol and the solution was cooled to 0°. Propylene sulphide (33.3 g., 0.45 g.-mole) was added slowly, and the solution was then allowed to warm to room temperature. The solution was refluxed gently for 30 minutes, and then cooled. The lower layer of the mixture was separated, and freed from volatile materials by being heated at 70° under 14 mm. pressure. There remained 32 g. of a fairly viscous, clear liquid having an average molecular weight, as determined by acetylation, of 1900. Absence of N-H stretch absorption in the infra-red spectrum of the product, coupled with other analytical data, indicated the product to have the formula:

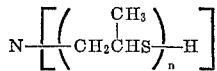

Flexibiliser E

Propylene sulphide (37 g., 0.5 g.-mole) was added slowing with stirring to 33% w./w. aqueous ammonia solution (150 ml.) at 16°. The mixture warmed spontaneously to 60° and was maintained at that temperature for 2 hours. The mixture, on being cooled, separated into two layers. Volatile materials were removed from the lower layer by heatin this at 80° under 14 mm. pressure. There remained an almost odourless liquid of low viscosity, containing a small proportion of secondary amino groups and having an average molecular weight (as determined by acetylation) of 660. The yield was 31.8 g., i.e. 81% of the theoretical value.

Flexibiliser F

Propylene sulphide (74 g., 1 g.-mole) was added to a solution of ethylenediamine (3 g., 0.05 g.-mole) in dimethylformamide (50 ml.) heated to 80° at a rate sufficient to maintain the mixture at this temperature without the external application of heat. When addition had been completed, the mixture was heated at 130° for 10 minutes; volatile materials were then removed by heating of the mixture at 80° under 0.2 mm. pressure. The residue was a colourless liquid of medium viscosity having an average molecular weight (as determined by acetylation) of 1590. Infrared spectroscopy indicated the product to be substantially free from amino groups. The yield was 71.4 g., i.e. 93% of the theoretical value.

The following examples illustrate the invention. Unless otherwise specified, "parts" denotes parts by weight. The tensile strength and elongation of the cured products were determined by mounting an unmachined specimen, 7.62 cm. x 1.9 cm. x 3.2 mm., at 23° in a tensile testing machine so that the initial jaw separation was 3.05–3.56 cm., and then increasing the separation at a rate of 5.1–6.3 mm./minute until failure occurred. The water resistance of the cured products was determined according to British Plastics Federation Specification ZA 166ADB 107, except that the specimens, after immersion, were reconditioned to constant weight at 60°.

EXAMPLE I

A mixture comprising 15 parts of a liquid epoxide resin (hereinafter termed "Epoxy A"), obtained in known manner from Bisphenol A and epichlorohydrin and having an epoxide content of 5.2 equiv./kg., 15 parts of Flexibiliser A and 2.9 parts of N,N-diethylpropane-1,3-diamine cured within 24 hours at room temperature to a tough, flexible resin. A sample of the cured resin, after immersion in water for 7 days at 25°, exhibited a 0.9% increase in weight.

EXAMPLE II

A mixture of 10 parts of Epoxy Resin A, 10 parts of Flexibiliser B, and 1.8 parts of a commercially-available reaction product of triethylenetriamine and propylene oxide cured within 18 hours to a tough, clear, flexible resin.

EXAMPLE III

A mixture was prepared from Epoxy Resin A (100 parts), Flexibiliser C (100 parts), and triethylenetetramine (5.5 parts), and degassed at room temperature. The mixture had a pot life of about 90 minutes, and became tack-free within 24 hours. The product was a flexible, tough, clear resin which did not harden further after post-curing at 80° for 24 hours.

EXAMPLE IV

A mixture comprising Epoxy Resin A (100 parts), Flexibiliser D (100 parts), and triethylenetetramine (12 parts) gelled within 6 hours, and yielded a tack-free, fully cured, tough, flexible casting within 24 hours.

EXAMPLE V

A mixture of Epoxy Resin A (10 parts), Flexibiliser E (11 parts), and 2,4,6-tris(dimethylaminomethyl)phenol (1 part) had a very low viscosity at room temperature and was readily degassed. The mixture had a pot life of 4 hours and cured within 24 hours at room temperature to a very tough, flexible casting which did not harden further after post-curing at 80°.

EXAMPLE VI

A mixture of Epoxy Resin A (10 parts), Flexibiliser F (10 parts) and Laromin LR 1035 (2.1 parts) had a pot life of at least 5 hours. It cured within 48 hours at room temperature to a tough, flexible casting which did not harden further after post-curing for 24 hours at 80°. (Laromin LR 1035 is a long chain aliphatic diamine available from Badische Anilin-und-Soda Fabrik and having an equivalent weight, with respect to hydrogen, of 75.)

EXAMPLE VII

Compositions, each comprising 100 parts of Epoxy Resin A, 5 parts of N-benzyldimethylamine and the indicated amount of Flexibiliser E, had the following properties:

| Flexibiliser E (parts) | Initial viscosity at 25° (poises) | After cure for 7 days at 23° | | |
|---|---|---|---|---|
| | | Tensile strength at 23° (kg./sq.cm.) | Elongation at 23°, percent | Water resistance on immersion for 7 days at 25°, percent |
| 60 | 11 | 265 | 180 | 0.66 |
| 68 | 10 | 270 | 180 | 0.76 |
| 76 | 9 | 240 | 180 | 0.79 |
| 82 | 8 | 245 | 190 | 0.92 |
| 90 | 7 | 140 | 330 | 1.04 |

EXAMPLE VIII

Compositions, each comprising 100 parts of Epoxy Resin A, 70 parts of Flexibiliser E and the indicated amount of Laromin C 260 (a liquid cycloaliphatic amine, having an equivalent weight with respect to hydrogen of 60, available from Badische Anilin-und-Soda-Fabrik), had the properties shown in the following table. In the case of the composition marked* there was used, in place of the Flexibiliser E, 67 parts parts of "Thiokol LP 3."

| Laromin C 260 (parts) | After cure for 7 days at 23° | | | |
|---|---|---|---|---|
| | Initial viscosity at 25° (poises) | Tensile strength at 23°, (kg./sq.cm.) | Elongation at 23°, percent | Water resistance on immersion for 7 days at 25°, percent |
| 10 | 12 | 135 | 160 | 0.68 |
| 15 | 10.5 | 190 | 190 | 0.76 |
| 20 | 8.5 | 185 | 170 | 0.76 |
| 24* | (¹) | 210 | 58 | (¹) |
| 25 | 7 | 180 | 200 | 0.86 |

¹ Not determined.

What is claimed is:
1. A curable composition of matter which comprises
   (a) a 1,2-epoxy compound having a 1,2-epoxy equivalency greater than 1,
   (b) a curing agent for the 1,2-epoxy compound (a), and
   (c) as flexibilizing agent an adduct of (1) a monoepisulphide with (2) a compound containing at least two active hydrogen atoms selected from the group consisting of ammonia, primary amines, disecondary amines, hydrogen sulphide and polythiols, said adduct containing on average at least two mercaptan groups per molecule.
2. A composition according to claim 1, wherein the monoepisulphide (1) is an alkylene episulphide containing from 2 to 5 carbon atoms.
3. A composition according to claim 2, wherein the monoepisulphide (1) is propylene sulphide.
4. A composition according to claim 1, wherein the compound containing at least two active hydrogen atoms is an alkanedithiol.
5. A composition according to claim 1, wherein the compound containing at least two active hydrogen atoms is a diprimary polyamine containing from 2 to 20 carbon atoms.
6. A composition according to claim 1, wherein the adduct (c) is one formed from propylene sulphide and ammonia and has an average molecular weight of 500 to 2500.
7. A composition according to claim 1, wherein the 1,2-epoxy compound (a) is a polyglycidyl ether of a polyhydric phenol.
8. A composition according to claim 1, wherein the curing agent (b) is a polyamine.
9. A composition according to claim 1, wherein the curing agent (b) is a tertiary amine.

References Cited

UNITED STATES PATENTS

| | | | |
|---|---|---|---|
| 2,466,963 | 4/1949 | Patrick | 260—79.1 |
| 2,490,984 | 12/1949 | Synder | 260—609 |
| 2,789,958 | 4/1957 | Fettes | 260—30.8 |
| 2,849,416 | 8/1958 | Bender | 260—30.8 |
| 3,310,601 | 3/1967 | Acetis | 260—830 |
| 3,291,776 | 12/1966 | Newey | 260—30.8 |
| 3,232,936 | 2/1966 | Reynold | 260—79 |
| 3,322,851 | 5/1967 | Berenbaum | 260—79 |

OTHER REFERENCES

Lee, Epoxy Resins, 1957, p. 173–175.

JULIUS FROME, *Primary Examiner.*